Nov. 22, 1966   I. S. ROSS   3,286,818
AUTOMATIC BELT CONVEYOR COVERS FOR
USE WITH TRAVELLING TRIPPER

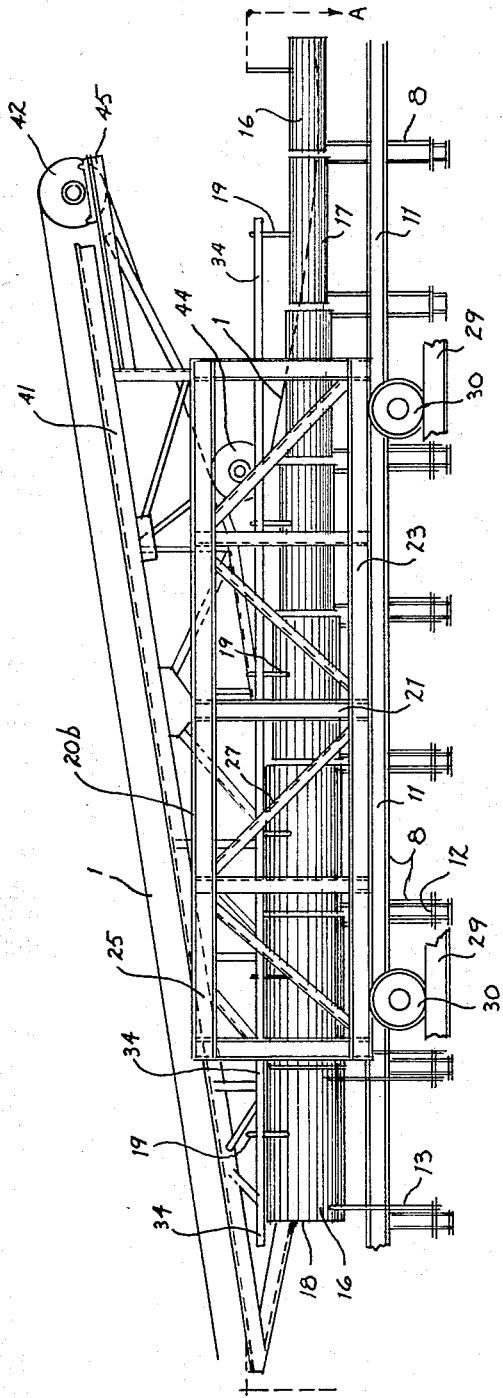

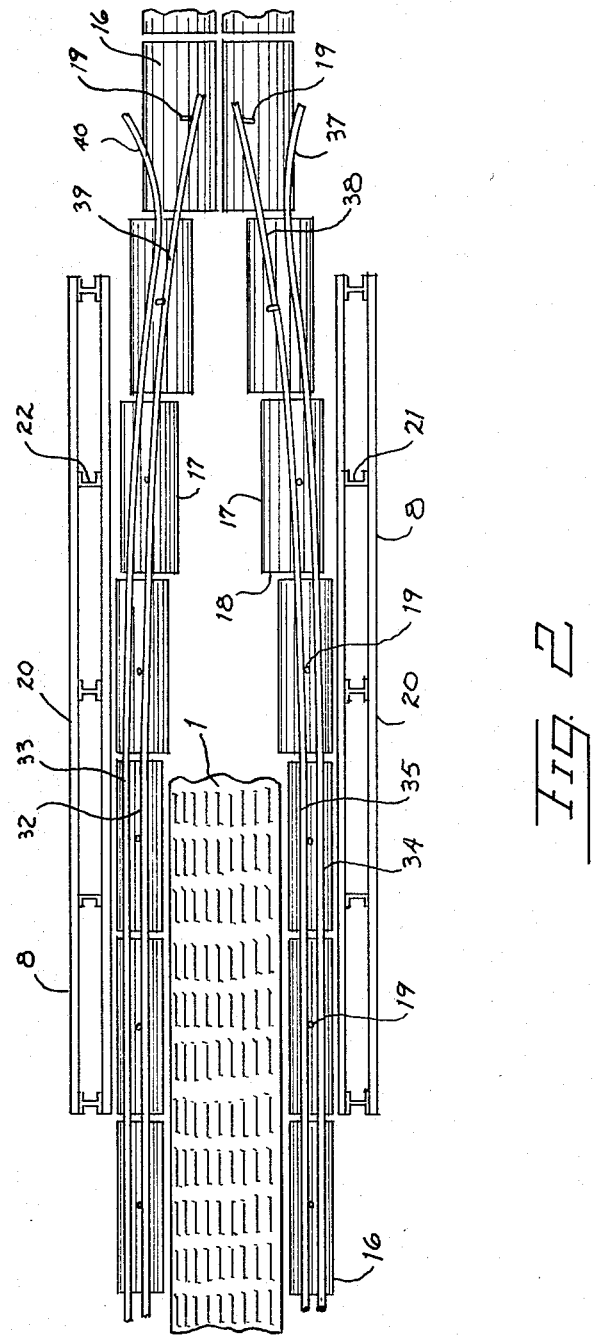

Filed Dec. 17, 1964   3 Sheets-Sheet 3

INVENTOR
Ian Scott Ross

United States Patent Office 3,286,818
Patented Nov. 22, 1966

3,286,818
AUTOMATIC BELT CONVEYOR COVERS FOR USE WITH TRAVELLING TRIPPER
Ian Scott Ross, 1334 W. Pender St., Vancouver, British Columbia, Canada
Filed Dec. 17, 1964, Ser. No. 419,034
8 Claims. (Cl. 198—204)

The invention relates to automatically operated belt conveyor covers for protecting various materials from the weather, particularly to belt conveyors provided with a travelling tripper or opening mechanism mounted on a tripper carriage for movement with a belt conveyor. The travelling tripper may if desired be operated in conjunction with a travelling hopper, a travelling feeder or any desired piece of auxiliary equipment. The travelling tripper and any desired travelling auxiliary equipment is equipped with mechanism designed to automatically open the belt-conveyor covers to permit material to be discharged from the belt conveyor either to the side or to another conveyor travelling in a different direction, the discharge taking place from any point along the belt conveyor's length.

In one example of this invention the travelling tripper makes possible the discharge of material to a travelling inclined conveyor and shiploader traversing 480 feet of a deep sea loading wharf.

It is known to provide hoods or covers for various types of belt conveying apparatus which may be opened manually or mechanically. These known types of covers for belt conveying apparatus may be articulated to permit passage over pulleys.

The main object of this invention is to provide weather protection for materials being conveyed on a belt conveyor while still allowing full use of a tripper.

Another object is to provide belt conveyor covers which are automatically opened and closed by a tripper.

Another object is to provide conveyor belt covers which are automatically operated and have only a few working and wearing parts.

Another object is to provide conveyor belt covers which are automatically operated, are more economical, more attractive in appearance and easily maintained.

The above objects are accomplished by providing covers for a belt-conveyor which are opened and closed automatically by a tripper. The belt-covers are mounted on a longitudinal conveyor-belt frame of any desired length, on which are pivotable frame members designed to support the covers.

The cover mechanism is made up of a series of paired sections, the sections being mounted over the pivotable frame members which are situated on each side of the belt conveyor and are of such a length that they extend from one pivoted frame member to the next. When the covers are in closed position they extend to the corresponding longitudinal edges of the covers pivoted on the opposite side of the conveyor belt frame, and they also engage with the transverse edges of the preceding and succeeding cover sections. The metal edges should preferably be covered with rubber or a resilient plastic material in order to provide a weather-proof seal.

The cover members are provided with upwardly extending arms or pins for engaging a guiding mechanism or track device mounted longitudinally of the travelling tripper structure. The guide mechanism is so shaped that when contacted by the arms or pins the covers may be either closed or opened for the desired operation.

The invention consists in the construction, combination, and arrangement of parts hereinafter to be fully described and shown in the accompanying drawings.

FIGURE 1 is a side elevational view of a tripper mechanism, a portion of the belt conveyor and a section of the cover mechanism that covers the belt conveyor.

FIGURE 2 is a plan view of the tripper and part of the belt conveyor on the line A—A of FIGURE 1.

Figure 4:
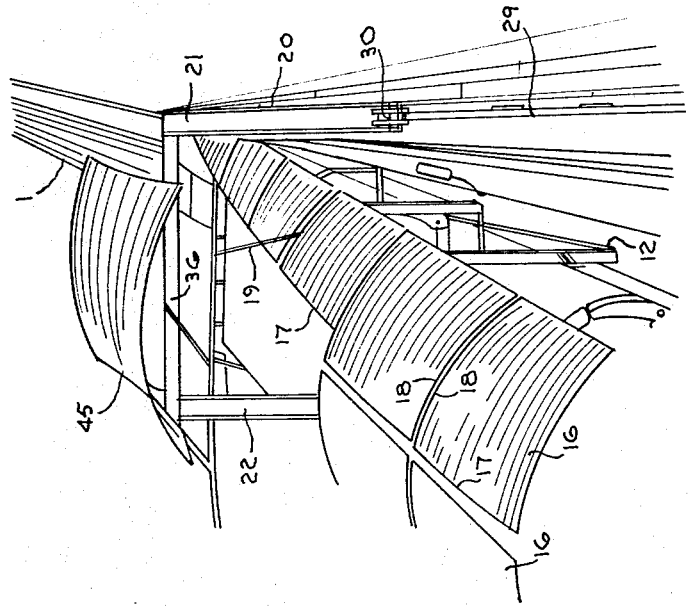
FIGURE 4 is a perspective view of part of the tripper, belt conveyor and covers for the belt conveyor.

It is to be understood that for the purposes of the invention the drawings illustrate a portion only of the cover mechanism, the portion illustrated including seven pairs only and part of an eighth pair out of the entire series of paired cover sections. The three pairs at the left of FIGURES 1 and 2 are fully open, the fourth, fifth and sixth are being progressively opened while the seventh and eighth are fully closed, though the seventh is about to be opened. It will be obvious that to the left of FIGURES 1 and 2 several pairs of cover sections are progressively closing.

Referring to the drawings, an endless conveyor belt 1 is shown and will be of sufficient length for conveying various materials, for example along wharves for loading into ships, or for other purposes. The conveyor belt 1 may be trough shaped as shown at 2 in FIGURE 3 while conveying material. The trough shape is formed in the belt conveyor 1 by idlers 3, 4 and 5 which are mounted below the belt 1 with the two outer idlers 3 and 5 sloping upwards while the idler 4 is horizontal. Similar idlers 3, 4 and 5 are spaced predetermned distances apart according to and depending on, the length of the conveyor belt 1.

Figure 3:
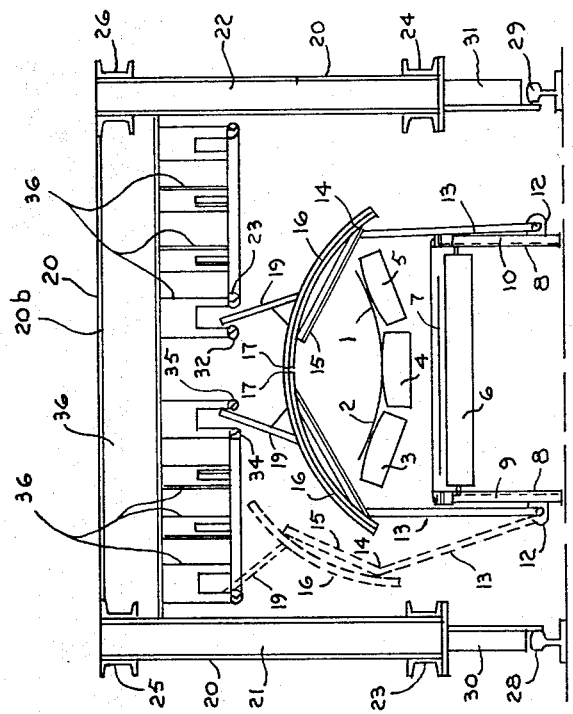
FIGURE 3 is a vertical cross section view, partly in perspective, showing the belt conveyor, covers for the belt conveyor and the tripper mechanism.

The conveyor belt 1 passes around suitable head and tail pulleys (not shown) and the lower returning part 7 of the belt 1 is supported by return idlers 6 such as shown in FIGURE 3, the return idlers 6 being spaced predetermined distances apart as is well known in the art.

A frame indicated generally by arrows 8 is constructed as shown in FIGURES 1, 3 and 4 to support the belt 1 and the idlers 3, 4, 5 and 6, as schematically shown in FIGURES 3 and 4. The frame 8 consists of vertical frame members 9 and 10 spaced at predetermined distances apart along the entire length of the conveyor belt 1. Longitudinal horizontal frame members 11 are connected to the vertical frame members 9 and 10 and assist in maintaining the belt 1 and the idlers 3, 4, 5 and 6 in desired position. The longitudinal frame members 11 extend along the both sides of the frame 8.

Pivot mounts such as bracket members 12 are shown in FIGURE 3 and may be mounted on the outer edges of and adjacent the lower ends of vertical frame members 9 and 10. Pivotable members 13 have their lower ends in pivotal engagement with pivot mounts 12. If desired members 13 may be bent inwardly at 14 to form a sloped arm 15, that is to say, the members 13-15 may be formed in one piece. On the other hand if preferred two sections 13 and 15, may be suitably joined at 14, but in any event constitute paired, rigid angular members situated on either side of frame 8. Metal cover members 16, which may be corrugated are mounted above members 15 and secured to them, the members 16 extending longitudinally of the frame 8. The metal cover members 16 are constructed with a curved shape as shown in FIGURES 3 and 4 and are of such dimensions that when in closed position, as shown in FIGURES 3 and 4, their longitudinal inner edges 17 come together as closely as possible, and if desired may overlap, and their transverse edges 18 also come together as closely as possible or may also overlap, in order to provide weather protection for the materials on the conveyor belt 1. If desired the metal edges may be edged with rubber or plastic to provide a seal against the weather. The cover members 16 extend in the form of an arch in oppositely situated pairs from end to end over the complete length of the conveyor belt 1.

The upper sides of the cover members 16 are provided with arms or pins 19 extending upwardly at an angle as shown in FIGURE 3, and are designed for the purpose of engaging with the lifting or opening mechanism for opening or closing the covered members 16, the details of which will be described later.

A tripper carriage mechanism is illustrated generally at 20 in FIGURES 1, 3 and 4. The mechanism has tripper carriage member 20b which together with tripper frame members 21 and 22, horizontal tripper frame members 23, 24, 25 and 26, and diagonal tripper frame members 27, form the frame for, and in addition provide support for the tripper carriage mechanism 20. Tracks 28 and 29 are fixed to the wharf or other support on each side of the tripper carriage mechanism 20 which is mounted on wheels 30 and 31, the wheels 30 and 31 engaging the tracks 28 and 29 respectively. The tripper carriage mechanism 20 as shown in FIGURE 3 straddles or is exterior to the fixed frame 8 for supporting the belt 1 and the idlers 3, 4, 5 and 6 and is of sufficient width to permit the metal covers 16 to open to the desired distance.

The opening mechanism for the covers 16 is clearly shown in FIGURES 2 and 3 and comprises two pairs of cam-track structures suspended from tripper carriage member 20b (FIGURE 3) by means of brackets. One cam-track consists of guides 32 and 33 and the other of guides 34 and 35, and the cam-tracks diverge to open the covers, run parallel to maintain the covers in open position and converge to close the covers.

Cover opening guides 32, 33, 34 and 35 are preferably in the form of metal pipes mounted and suspended from the lower sides of the upper transverse tripper frame members 20b of the tripper carriage mechanism 20 by means of brackets 36. The cover opening guides 32, 33, 34 and 35 extend lengthwise of the tripper carriage mechanism 20 as shown in FIGURES 1, 2, 3 and 4. The guides 32, 33, 34 and 35 are curved generally inwardly at both ends of the tripper carriage 20 as indicated at 37, 38, 39 and 40 in FIGURE 2, to close the cover members 16 when the material being conveyed on the belt 1 is outside the area of the tripper carriage mechanism 20. The cover opening arms or pins 19 on the cover members 16 are so situated (see FIGURE 3) as to pass between the adjacent pairs of cover opening guides 34 and 35 and 32 and 33 and thus the arms or pins 19 automatically control the opening and closing of the cover members 16.

An inclined tripper frame structure 41 is mounted on and above the upper part of the tripper carriage mechanism 20 as shown in FIGURE 1 and slopes upwardly in the direction shown. An idler pulley 42 is mounted at the upper end of the tripper frame 41 and 43 and a second idler pulley 44 is mounted below the tripper frame 41, the pulleys 42 and 44 assisting in maintaining proper tension on the conveyor belt as it travels over the head and tail pulleys (not shown). The conveyor belt 1 passes upwardly along the tripper frame 41 as shown in FIGURE 1, and over the pulley 42, then downward and rearwardly over the pulley 44, and then forwardly again. The tripper frame 41 and the tripper carriage mechanism 20 travel along the wharf as a unit for the length of the belt conveyor 1. The material on the belt conveyor 1 is transferred from any point along the belt conveyor 1 to the tripper frame 41 and after reaching the upper end 43 of the tripper frame 41 the material is transferred to a suitably connected ship loader or other conveying mechanism not shown.

From the above description of the invention, the operation of the automatic belt covers should be clearly understood. With the conveyor belt in operation and conveying a certain type of required material, the tripper carriage mechanism 20 with the tripper frame 41 and the connected ship loader is moved along the conveyor to the desired position on the wharf for loading the ship. The cover opening arms 19 will pass between the cover opening guide members 32, 33, 34 and 35 and thus move the cover members 16 automatically from closed to open position within the tripper carriage and below the tripper frame 41. This permits the material on the conveyor belt 1 to pass upwardly along the tripper frame 41 to the ship loader. In other words, the cover members 16 must be opened ahead of the point (i.e. the extreme left-hand end of the FIGURES 1 and 2) at which the belt conveyor 1 moves upwardly over the inclined tripper frame structure 41 toward pulley 42 at which point the material being conveyed by belt 1 drops onto or into another conveying mechanism.

It is to be understood that the above described arrangements are simply illustrative of the application of the principles of the invention. Numerous other arrangements may readily devised by those skilled in the art which embodies the principles of the invention and fall within the spirit and scope thereof.

The embodiments of the invention in which an exclusive property or privilege is claimed are defined as follows:

1. Conveyor belt cover and cover opening mechanism comprising in combination a conveyor belt travelling within a frame over conventional head and tail pulleys and idlers, a plurality of openable cover members pivotally mounted on said frame and over said conveyor belt, engaging-pins extending upwardly from said cover members, movable tripper carriage mechanism situated above said cover members, cover-opening mechanism suspended from said movable carriage and being engageable with said engaging-pins, and an inclined tripper frame member secured above said tripper carriage.

2. Cover and cover opening mechanism for use in conjunction with a conveyor system and comprising a plurality of paired, oppositely-situated, arched and pivotable cover sections mounted in end-to-end relationship on a stationary frame above a conveyor belt, the sections coming together in abutting relationship along their inner longitudinal edges, an engaging-pin extending upwardly from each of said cover sections, movable carriage mechanism suspended above said cover sections, said carriage having mounted thereon paired cam-track devices adapted to engage said engaging-pins and thereby to lift said cover sections to open position, maintain them in open position for a predetermined distance, guide them to closed position and dis-engage from them.

3. The invention as claimed in claim 1, said cover opening mechanism consisting of paired, oppositely-situated cam-track devices, each track being composed of horizontally-mounted, longitudinally-extending and substantially-parallel guide members, each cam-track device extending from end to end of said movable carriage mechanism, the two said devices being convergent endwise and divergent centerwise of said carriage mechanism.

4. Automatic belt conveyor covers as defined in claim 1 in which the said carriage means consists of a carriage frame movably mounted on tracks and extending over said conveyor belt supporting frame.

5. The invention as claimed in claim 1, each of said cover members beings secured to one of a pair of pivoted members, each of said pivoted members being pivotally mounted by means of its lower end on a bracket secured to said frame, said cover members being paired and curved concentrically so that each pair forms an arch over said conveyor belt.

6. Automatic belt conveyor covers for use with a travelling tripper, travelling hopper, travelling feeder or a travelling combined hopper feeder comprising a conveyor belt frame, a conveyor belt movably supported on idlers mounted on said conveyor belt frame, cover members adapted to extend over said conveyor belt, pivoted members mounted on said conveyor belt frame supporting said cover members, cover opening pins mounted on the top of said cover members, a tripper carriage extending over said conveyor belt and cover members movable longitudinally of said conveyor belt, means carried by said tripper carriage in engagement with said cover opening pins for opening and closing said cover members upon movement of said tripper carriage.

7. Automatic belt conveyor covers as defined in claim 1 in which the means mounted on said tripper carriage mechanism for opening and closing said cover members consists of guide members horizontally and longitudinally mounted on said tripper carriage and curved at their ends, said guide members having contact with said engaging pins to open and close said covers upon movement of said tripper carriage.

8. Apparatus for covering a conveyor belt and for progressively opening and closing said covering comprising in combination a series of identical stationary frame units secured together in end-to-end relationship, each of said units having vertical side frame members secured together by longitudinal and transverse members, rollers mounted transversely of each unit for supporting said belt, pivoted members having one end piovtally mounted on the vertical side frame members for swinging movement towards and from the side frame members, the free ends of said pivoted members extending above and over said belt when in vertical position, curved sheet metal members secured to the free ends of said pivoted members with their inner longitudinal edges in abutting engagement when said pivoted members are swung to a vertical position, so that the sheet metal members cover said belt, a movable outer frame covering said stationary frame units and movable along the series of frame units from end to end of said series, said outer frame having vertical side frame members secured together by horizontal suspension bars, brackets depending from said suspension bars, paired track members suspended from said brackets on opposite sides of the longitudinal center line of said movable frame, the ends of said tracks being convergent, pins extending upwardly from said sheet metal members for engaging the converging ends of said tracks when said movable frame is moved along the belt in a direction to engage the pins with the tracks, whereby said sheet metal members are moved to an open position upon entering the tracks and to a closed position upon leaving the tracks, and an inclined elevating frame member mounted on said movable frame above said tracks for elevating said conveyor belt when said sheet metal members are opened.

References Cited by the Examiner

UNITED STATES PATENTS

| | | | |
|---|---|---|---|
| 910,986 | 1/1909 | Blaisdell | 198—86 X |
| 2,038,471 | 4/1936 | Benatar | 198—204 |
| 2,644,572 | 7/1953 | Mercier | 198—204 |
| 2,837,203 | 6/1958 | Reeser | 198—204 |

SAMUEL F. COLEMAN, *Primary Examiner.*

EVON C. BLUNK, *Examiner.*

R. E. KRISHER, *Assistant Examiner.*